United States Patent [19]

Bouteille et al.

[11] Patent Number: 4,702,276

[45] Date of Patent: Oct. 27, 1987

[54] ASSEMBLY OF CONNECTIONS FOR PNEUMATIC JACKS

[75] Inventors: Daniel Bouteille, Ville D'Avray; Michel Nicolas, Neauphle le Chateau; Pierre Prudhomme, St. Germain en Laye, all of France

[73] Assignee: La Telemecanique Electrique, Nanterre, France

[21] Appl. No.: 813,782

[22] Filed: Dec. 27, 1985

[30] Foreign Application Priority Data

Dec. 28, 1984 [FR] France .............................. 84 20038

[51] Int. Cl.[4] .............................................. F16L 37/28

[52] U.S. Cl. ................................ 137/580; 137/599.1; 251/149.6

[58] Field of Search ............................ 137/580, 599.1; 251/149.6

[56] References Cited

U.S. PATENT DOCUMENTS

| | | | |
|---|---|---|---|
| 543,008 | 7/1895 | Gale | 137/580 |
| 2,089,547 | 8/1937 | Folliot | 137/580 |
| 3,893,477 | 7/1975 | Stoll et al. | 137/599.1 |
| 4,214,607 | 7/1980 | Bouteille | 137/499 |
| 4,356,760 | 11/1982 | Bouteille | 137/615 |

*Primary Examiner*—A. Michael Chambers

*Attorney, Agent, or Firm*—Cushman, Darby & Cushman

[57] ABSTRACT

An assembly of operational connections for a pneumatic jack, having combined mounting for ensuring at least two operations. A first operational connection (1) ensuring the operation of regulating the discharge from the jack is provided beyond its endwall (4) which is pierced with a hole (5), with an assembly collar (6) in which is mounted a second operational connection (15) which ensures any other desired operation, arranged perpendicularly to the first operational connection (1) and equipped with a common projecting threaded ferrule (19) for the mounting of the assembly upon a jack cylinder.

10 Claims, 8 Drawing Figures

ASSEMBLY OF CONNECTIONS FOR PNEUMATIC JACKS

The object of the invention is an assembly of connections for pneumatic jacks, which accomplish various respective operations, such as the regulation of the flow of air in one direction (a connection regulating the flow of air leaving the jack to enable its speed of operation to be regulated), detection of the drop in air pressure (connection detecting drop in pressure and for the emission of a corresponding pneumatic or electrical signal), closure of the piping for discharge of the air from the jack (connection blocking the air outlet, which stops the travel of the jack in the state where it is at the moment of blocking), rapid venting from the jack of the air which it contains (venting or isolating connection which suppresses instantaneously the force being exerted by the jack), etc.

Operational connections of this species are known individually and they are also employed individually. When it is desired to employ only one operational connection it is mounted directly upon the cylinder of the jack by means of a threaded ferrule provided on each connection and a threaded hole provided on the cylinder. When it is necessary or desirable to employ a number of operational connections upon one and the same jack, they are assembled as best one may, either by "adding" them to one another or by means of intermediate connecting pieces which exhibit both threaded ferrules and holes in number and position which suit the mounting of the desired connections.

This way of doing it has a number of disadvantages the main one of which is that it increases the bulk of the assembled operational connections; again, these being further from the cylinder, the time necessary for their full effect is prolonged, whereas for certain of them the role of which is in relation to safety, the greatest rapidity of action is desirable.

In practice it is found that it is often necessary to employ upon one and the same jack two operational connections; even in this general case when only two connections are mounted upon one jack, their increased bulk and their longer reaction time are real disadvantages.

The main aim of the invention is to eliminate these disadvantages and to occasion for pneumatic jacks an assembly of operational connections capable of being mounted singly or in pairs on a pneumatic jack whilst occupying the smallest volume and exhibiting the relative arrangement which is the most judicious both with respect to the jack and to the point of view of their operation.

In an assembly of operational connections for a pneumatic jack, in accordance with the invention, a first connection has a body elongated in one direction containing operational organs and terminated at one end by an endwall with at this end and preferably in this endwall a channel of communication, and this first connection is provided at this end with a means of assembly; second connections have a body elongated in one direction containing operational organs, with a sidewall in which is arranged a channel of communication and with a free end portion forming a threaded ferrule for mounting on a jack cylinder, these second connections being provided with a means of assembly complementary with the means of assembly of the first connection, the bodies of the assembled connections being disposed after assembly in perpendicular directions, with the channels of communication being placed in a state of communication and with the threaded ferrule of each second connection lying in a position projecting with respect to the means of assembly and to the body of the first connection.

With the arrangement defined above, each operational connection has a free end opposite to the end for the first connection and opposite to the threaded ferrule for the second connections, where the orifices are found which are necessary for its connection to the fluid pipework.

The means of assembly provided on the first connection is preferably a cylindrical collar situated at the bottom end of the elongated body of this connection, with its axis substantially perpendicular to the direction of this elongated body; the complementary means of assembly provided on the second connections consists of a cylindrical portion which is introduced and fixed in an airtight manner into the cylindrical collar. It is clear that other complementary means of assembly equivalent to those which have just been described might be adopted.

In accordance with one variant which might be applied to the realization of the invention, the second connections may be without a threaded ferrule for mounting. In this case the assembly of the operational connections in accordance with the invention comprises a threaded ferrule having at one end a portion adapted for mounting upon the complementary means of assembly of the first connection, having, for example, a cylindrical portion which is introduced and fixed into the cylindrical collar of the first connection opposite to the second connection, whilst bounding with the latter inside the means of assembly an internal volume into which opens the channel of communication arranged in the end of the first connection.

It is extremely preferable and very advantageous within the scope of the invention that the first operational connection be a connection for regulating the discharge.

Under these conditions, after assembly of two connections and attachment of these two assembled connections to the cylinder of a jack, the elongated body of the first discharge-regulating connection is parallel with the cylinder of the jack, whilst the second operational connection charged with any other desired operation (blocking connection or venting connection or a connection for detecting drop in pressure, . . . ) is disposed perpendicularly to the cylinder of the jack in prolongation of the common threaded ferrule which is screwed into the wall of the jack cylinder.

The first operational connection of discharge-regulating type has a hollow elongated body open opposite the endwall in order to enable introduction by sliding of an inner wall having two openings parallel with the longitudinal direction of the elongated body and a transverse blind hole, one of these openings being provided with a non-return valve in the direction of the escape of the fluid and the other of these openings opening into the blind hole transverse to the elongated body and terminated by an internal orifice with which is associated a choke mounted to be able to move in transverse displacement by means of a transverse regulating screw. The elongated hollow body preferably also has in its sidewall a side opening intended for receiving a plug which contains the head of the transverse regulating screw fixed in translation and free in rotation, the choke being itself fixed in rotation by the inner wall. The latter is kept in position inside the elongated body by a hollow stopper which is forced into this body and which exhibits the mouth necessary for the connection of fluid piping. The screw is advantageously arranged in parallel with the direction of the second operational connection when the latter is assembled with the first operational connection and the head of the control screw is situated at the side opposite that where there is the threaded ferrule for mounting on a jack.

A detailed description will now be given of an assembly of operational connections in accordance with a preferred embodiment which is in no way restrictive as far as the operations are concerned which are accomplished by these connections. Reference will be made to the attached drawings in which.

Figure 1:
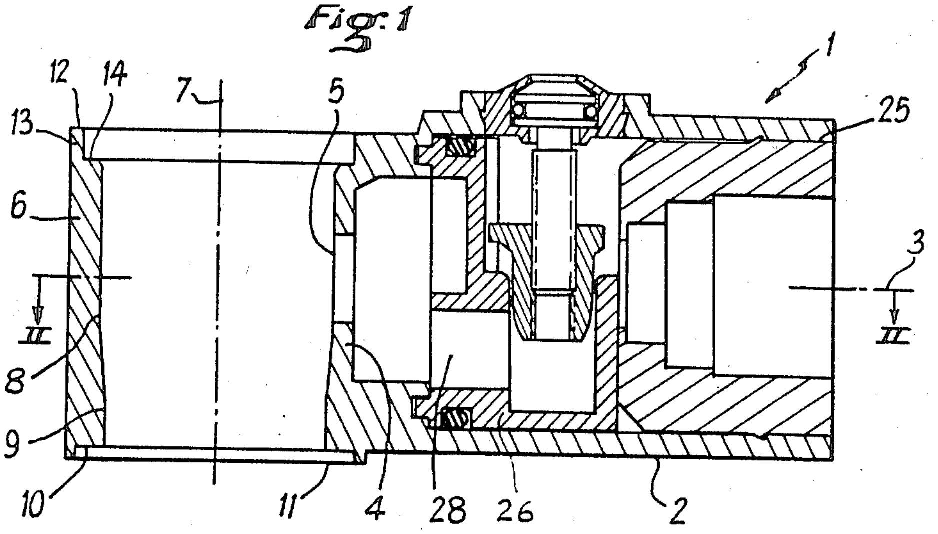
FIG. 1 is a section along the line I—I in FIG. 2, of a first operational connection in accordance with the invention, having the operation of regulating the discharge of the fluid.
Figure 2:
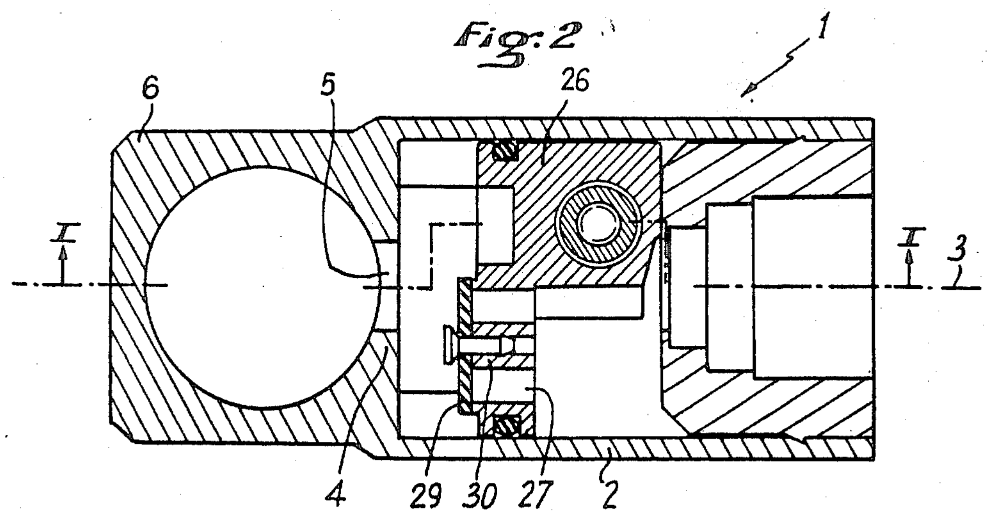
FIG. 2 is a section along II—II in FIG. 1.

FIGS. 1 and 2 show a first connection 1 represented alone, which forms part of an assembly of operational connections in accordance with the invention. This connection 1 has a hollow body 2 elongated in a direction which may be defined by that of its geometric axis 3. This body 2 terminates in an endwall 4 in which is arranged a channel of communication 5. At this same end where there is the endwall 4 the connection 1 is provided with a means of assembly consisting in this preferred embodiment of a cylindrical collar 6 having a geometric axis 7 (which may be seen in FIG. 1) which is preferably perpendicular to the geometric axis 3 of the body 2. The cylindrical collar 6 has preferably in the longitudinal direction a length substantially equal to the dimension in the same direction of the body 2; it defines a substantially cylindrical seating 8 open at its two opposite ends and having a profile adapted for receiving and holding in position in the direction of the axis 7 a second operational connection. In the present example the seating 8 exhibits at one end, the lower end when seen in FIG. 1, a contraction 9 of frustoconical profile in its diameter followed by a shoulder 10 having a larger diameter created from the lower outer face 11. At the opposite end the seating 8 terminates at its upper outer face 12 in an enlargement 13 in its diameter which produces an inner shoulder 14.

FIGS. 3 to 6 show how a second operational connection designated in these Figures by the general references 15, 15', 15'' and 15''' may be assembled with the operational connection 1. Each second connection 15, 15', 15'', 15''' has a body 16 which exhibits a cylindrical portion 17 designed in order to be introduced with a slight clearance into the seating 8 in the first connection 1. Because of the existence of the frustoconical contraction 9 the cylindrical portion 17 is tightened in the latter by its lower zone at a predetermined position which corresponds with the position in which an outer shoulder 18 from which starts the cylindrical portion 17 comes up against the upper outer face 12 of the collar 6, crushing against the inner shoulder 14 a toroidal seal located in the enlargement 13.

The cylindrical portion 17 of each second operational connection 15, 15', 15'', 15''' is prolonged by a threaded mounting ferrule 19 intended for projecting downwards outside the seating 9. A circumferential groove 20 is hollowed into the outer sideface of this threaded ferrule 19 at the desired location for receiving the inner edge of an elastic stop ring 21 which is arranged against the shoulder 10.

The means of assembly which has just been described enables the first operational connection 1 having a geometric axis 3 to be united firmly together with a second operational connection 15 or 15' or 15'' or 15''' having its geometric axis coincident with the geometric axis 7 and consequently perpendicular to the axis 3 of the first connection 1.

As is usual, the threaded ferrule 19 is hollow; it has an inner hole 22 which is prolonged in the axial direction inside the cylindrical portion 17 and into the body 16 in a manner suited to the role of the second connection. The sidewall of the cylindrical portion 17 is pierced by at least one and preferably a number of channels of communication 23 situated substantially opposite the zone where the channel 5 pierced in the end 4 of the first connection 1 opens out. Preferably there exists on the cylindrical portion 17 of the second connection in the zone of transition between the body 16 of this second connection and the threaded ferrule 19 for mounting upon a jack, a contraction in its diameter which after assembly creates an annular chamber 24 inside the collar 6; the channels of communication 23 are situated in this contraction and open out into the annular chamber 24 where the channel 5 opens out too.

The threaded ferrule 19 serves for mounting the two assembled connections on the wall of the cylinder (represented partially in dash-dot line in FIG. 3) of a jack which extends in parallel with the first connection 1 so that the second connection 15 is perpendicular to this cylinder.

The body 2 of the first connection 1 and the body 16 of the second connection may be employed for mounting upon them the operational organs appropriate to any desired operation.

It is especially advantageous within the scope of the invention to equip the body 2 of the first connection 1 with the organs necessary to the accomplishment of the operation of regulating the discharge of fluid from the jack.

Reference will be made again to FIGS. 1 and 2 in order to describe the operational organs interior to the connection 1, which serve for regulating the flow.

Opposite the endwall 4 the body 2 terminates in an end which exhibits an opening 25 through which has been introduced an inner wall 26 through which passes two openings 27 and 28 parallel with the geometric axis 3 of the body 2 and spaced from one another in the direction transverse to the latter. The opening 27 is equipped with a non-return valve 29; for ease of production, inside the opening 27 there is provided a central block 30 which is joined to the wall 26 by radial arms (not shown) and which serves for fixing at its centre the valve 29. In order to arrange for the latter the space necessary for its movements, the inner wall 26 is stopped at a distance from the endwall 4 by a stop 31 which may be seen in FIG. 3. The opening 28 is connected to a blind hole 32 which is transverse to the geometric axis 3 and with which is associated a choke 33 moved by a transverse screw 34. This choke 33 has a lobe 35 at the side, which engages in a transverse groove 36 hollowed in one portion of the inner wall 26. Facing the blind hole 32 the sidewall of the body 2 exhibits an opening 37 into which is introduced a plug 38. The latter serves as a bearing for the head 39 of the screw 34, which is accessible from outside. The latter being thus mounted to be free in rotation and fixed in translation, by making it turn the position of the choke 33 is regulated with respect to the orifice of the blind hole 32 in which it engages to a greater or less degree, so that the flow is also regulated, of the fluid which makes use of the opening 28 in proceeding from the jack.

The inner wall 26 is fixed in the longitudinal direction in the body 2 by a hollow stopper 40 enabling the connection of fluid piping (not shown); it is also fixed in rotation in the body 2 in accordance with a preferred arrangement in which the regulating screw 34 is parallel with the geometric axis 7 of the seating 8. In accordance with a variant the screw 34 might pass through the axis 3 instead of being offset as may be seen in FIG. 2.

Referring to FIGS. 3 to 6 together, it may be seen that the fluid which leaves the cylinder of the jack arrives directly and simultaneously at the two assembled operational connections, the first connection 1 being on the one hand for the regulation of the discharge and the second connection 15 or 15′ or 15″ or 15‴ on the other hand being for another operation, while following in both cases a short path. When the second connection does not have to come into operation, the whole of the fluid passes through the first connection 1. In the opposite direction at the time of feeding the jack, the fluid passes through the opening 27 in the direction allowed by the valve 29.

Figure 8:
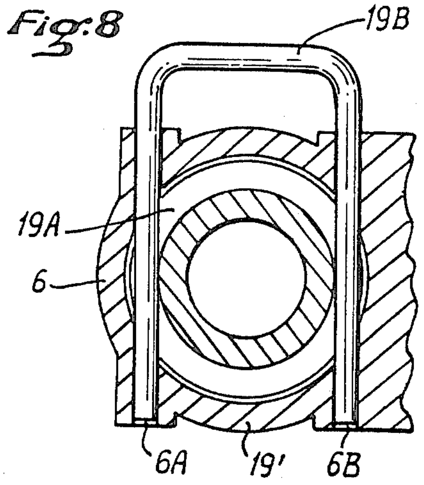
FIG. 8 is a section along VIII—VIII in FIG. 7.
Figure 7:
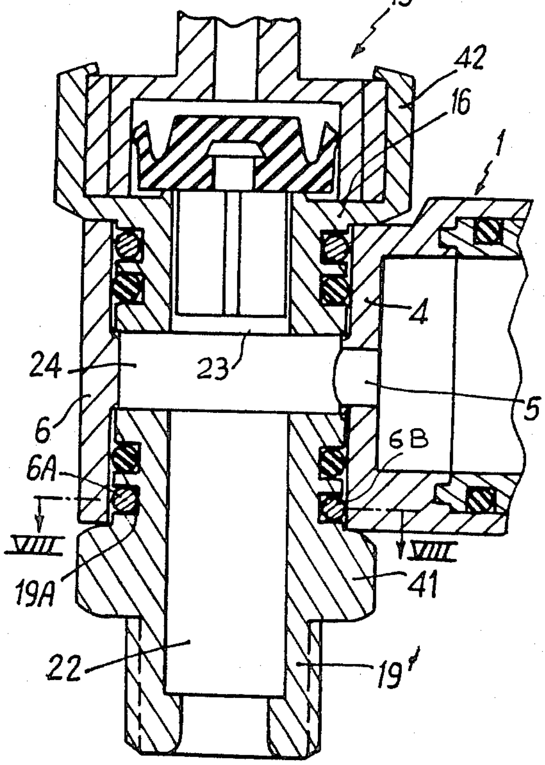
FIG. 7 is a partial section similar to FIG. 5 illustrating a variant embodiment in accordance with which the second connections are without a threaded ferrule for mounting and there is a threaded ferrule which is mounted independently upon the means of assembly provided on the first connection.

FIGS. 7 and 8 show a variant which may be adopted by realizing an assembly of operational connections in accordance with the invention. The first operational connection 1 is shown only partially; it is identical with that in FIGS. 1 and 2 with an assembly collar 6. Each second operational connection 15, 15′, 15″ or 15‴ is without the threaded ferrule 19. There exists therefore in an assembly in accordance with the invention an independent threaded ferrule 19′ provided with opposite faces or notches 41 which enable it to be handled for screwing it onto the cylinder of a jack. This ferrule 19′ is mounted in the lower end portion of the collar 6 with a toroidal seal seated in a suitable groove. It might be fixed to the collar 6 by a thread but it is preferable to adopt a means of attachment which allows complete freedom of rotation of the two connections assembled with respect to the ferrule 19′ when it is screwed and locked onto the cylinder of a jack. For example (FIG. 8) a circular groove 19A is hollowed in the outer face of the ferrule 19′ and two transverse holes 6A, 6B are drilled in the collar 6 in order to lie opposite the groove 19A after mounting. A pair 19B of two cotters which may be individual or joined in a U by an arm are forced into the holes 6A, 6B. A similar attachment may be adopted for the mounting of the second connection 15 on the collar 6 if it is desired to leave this second connection free in its orientation.

The independent threaded ferule 19′ has a limited length such that it is interrupted before the channel of communication 5 arranged in the endwall 4 of the first connection 1. Similarly the second connection is interrupted before reaching the channel 5. If necessary each second operational connection 15, 15′, 15″ or 15‴ is also provided with opposite faces or notches 42 as in the case of the other examples described here, enabling it to be screwed or unscrewed. As may be seen in FIG. 7, the second operational connection 15 is interrupted before the channel of communication 5. In this way this channel 5 communicates with the hole 22 inside the threaded ferrule 19′ by way of the chamber 24 which is no longer annular but cylindrical and into which the channel 23 also opens.

In accordance with this variant, one individual ferrule 19′ only is suitable for all of the second operational connections 15, 15′, 15″, 15‴.

In the case where the first operational connection 1 alone is to be employed on a jack it is sufficient within the scope of the invention to mount upon the assembly collar 6 in the place reserved for a second operational connection an airtight stopper.

Figure 3:
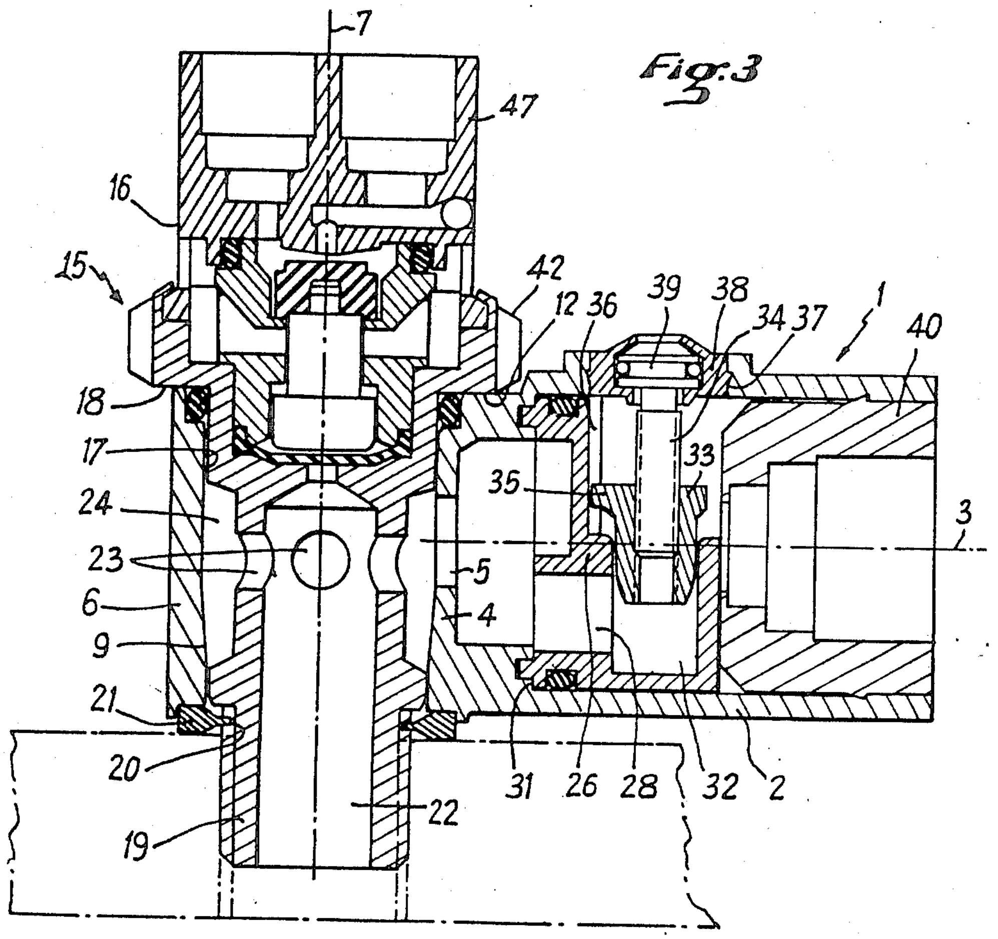
FIG. 3 is a section along a plane passing through the axis of the first connection as FIGS. 1 and 2, assembled with a second connection for the operation of detecting the drop in pressure.
Figure 4:
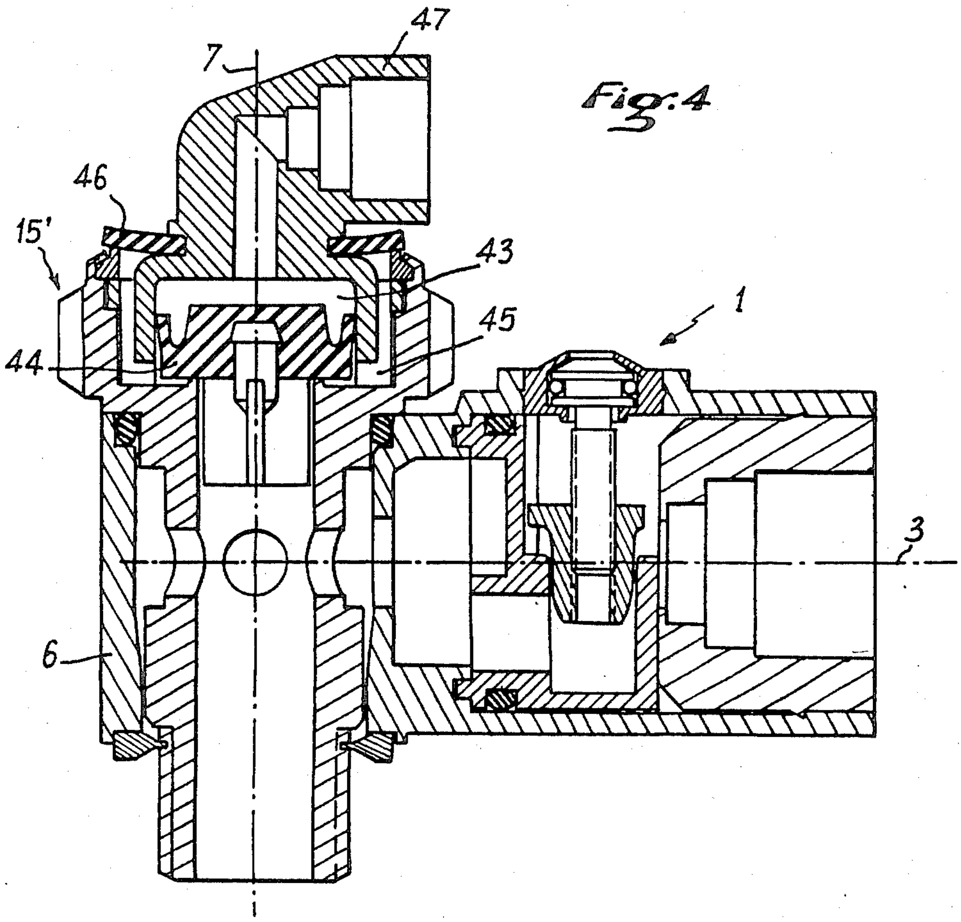
FIG. 4 is a view similar to FIG. 3 but the second connection is intended for the operation of rapid venting.
Figure 5:
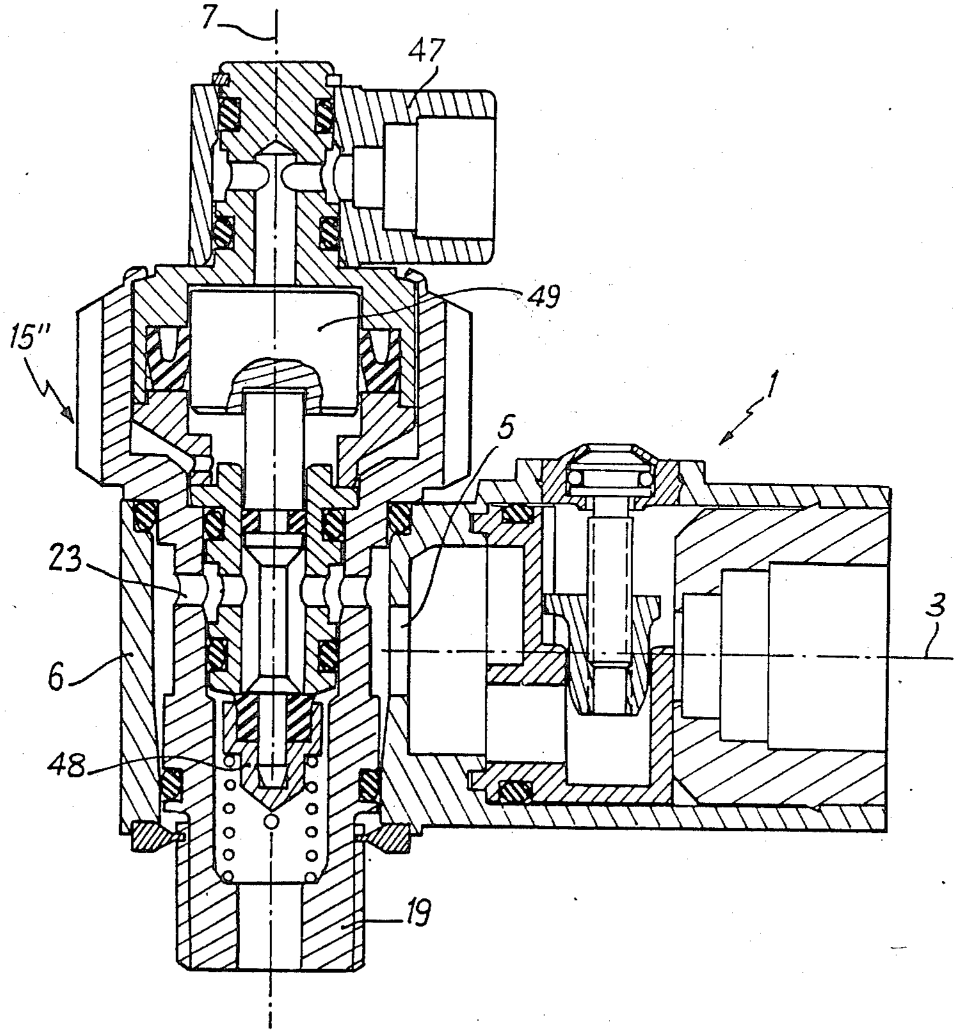
FIG. 5 is a view similar to FIG. 3 but the second connection is intended for the operation of blocking the jack.
Figure 6:
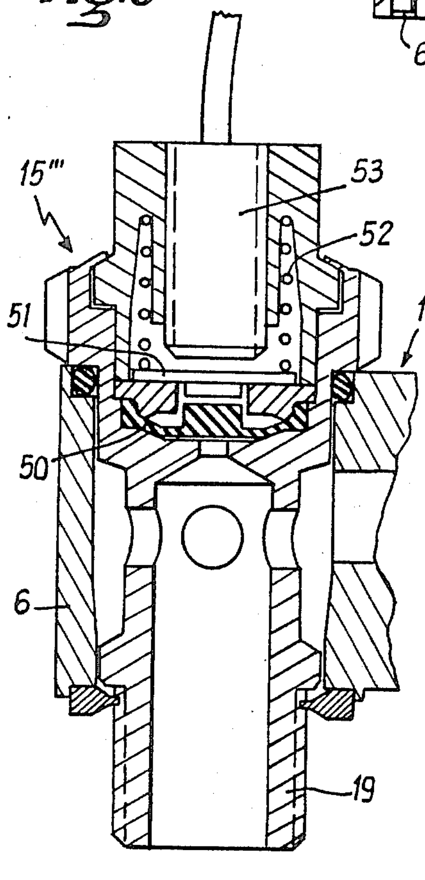
FIG. 6 shows a variant embodiment of the second operational connection for the detection of the drop in pressure and the emission of an electrical signal.

FIGS. 4, 5, 6 show examples in which the same first operational connection 1 is combined by means of the assembly collar 6 with a second operational connection different from that of FIG. 3. In FIG. 4 this second operational connection 15′ is a venting connection which comprises inside a first central chamber 43 a valve 44 which is kept applied against a seat by a pressure greater than the working pressure of the jack; removal of this higher pressure causes the air under pressure which is in the jack to lift the valve 44 and enter a second annular chamber 45; this is closed by an annular valve 46 which may easily be lifted, giving access directly to the atmosphere. Thus the jack is rapidly vented of the air under pressure which it contained. This FIG. 4 shows that the connecting ferrule 47 of the second operational connection to one or more pipes, may be transverse with respect to the geometric axis 7 and parallel with the geometric axis 3 of the first connection 1 whereas in FIG. 3 this connecting ferrule 47 is parallel with the geometric axis 7.

In FIG. 5 the second operational connection 15″ is a blocking connection. In the communicating passage which exists between the first operational connection 1 and the threaded ferrule 19 by way of the channels of communication 23 and 5, there is a valve 48 which is normally held away from its seat against the restoring force of a spring, by a piston 49 upon which is acting a fluid under pressure coming through the connecting ferrule 47. As soon as this fluid under prssure ceases to act upon the piston 49, the valve 48 shuts off the passage towards the first operational connection 1. The valve can no longer be emptied of its fluid nor fed with fluid and its movements are blocked.

In FIG. 6 the second operational connection 15‴ is a connection detecting drop in pressure with the emission of an electrical signal. In the body of this second connection 15‴ is mounted a flexible airtight diaphragm 50 which is followed on the opposite side from the threaded ferrule 19 by a metal plate 51 which is thrust towards the diaphragm 50 by a spring 52. Beyond this plate 51 there is an electrical detector member 53 of any suitable type. Every time the pressure which prevails in the jack deforms the diaphragm 50 in one direction or the other and brings the metal plate 51 up to or away from the detector member 53 the latter emits a corresponding electrical signal.

As has been said and shown by the foregoing examples, the second operational connection 15, 15', 15'', 15''', may be designed for any desired operation complementary to the operation of the first operational connection 1 which is advantageously of discharge-regulating type. As is apparent from the foregoing description, the first connection 1 is the connection which is parallel with the cylinder of the jack after mounting upon the latter. When for this first connection 1 the operation of regulating the discharge is adopted, that is to say, regulating the speed of action of the jack, the second connection 15, or 15', or 15'', . . . which accompanies this first connection 1 is then mounted directly opposite the threaded ferrule 19 or 19', in direct communication with the internal volume of the cylinder of the jack. Thus any error in mounting is eliminated; the two connections are necessarily mounted with the relative arrangement necessary to their correct operation. This first connection 1, intended for regulating the flow of fluid leaving the jack, may serve also but not necessarily for the entry of the fluid under pressure to the interior of the jack. In this case it contains an inlet opening 27 associated with a non-return valve 29 as described above.

We claim:

1. A connecting assembly for a pneumatic jack ensuring at least two functions one of which being a one way flow rate regulation comprising:

a first hollow body having a geometric axis and elongated in a direction defined by said geometric axis, terminated at one end by an end wall, with, at said end a first channel, said body being provided at said end with a cylindrical collar having an interior and having an axis which is substantially perpendicular to said geometric axis, said first channel opening out in the interior of said collar, a second body having a geometric axis elongated in a direction defined by said geometric axis thereof, located inside said interior of said·collar and defining in said interior a second channel permanently connected to the first channel, means for fastening said second body to said collar and said collar to the jack, operational means housed in said connecting assembly for ensuring a regulation of the air flow coming from the jack, said operational means being totally housed in said first body and beyond said end with respect to said collar, while at least second operational means are housed in the second body for ensuring at least one other operation.

2. A connecting assembly according to claim 1 wherein said first body is open at its end opposite to said end and includes an inserted inner wall having at least one aperture parallel with said geometric axis of said body and a transverse hole, said aperture opening into said transverse hole with which is associated a choke for regulating said flow, moved by a transverse regulation screw accessible from outside said first body.

3. A connecting assembly according to claim 2 wherein said inserted inner wall has two apertures parallel with the geometric axis of said body, one of said apertures being provided with a check valve which closes when air escapes from the jack, the other aperture opening into said transverse whole which is blind, said choke being mounted upon said regular screw arranged in parallel with the geometric axis of said collar.

4. A connecting assembly according to claim 3 wherein said inner wall is longitudinally and rotatably fixed in the body by a hollow connector stopper in a position in which said regulation screw is parallel with said axis of said collar.

5. A connecting assembly according to claim 1 wherein said fastening means are integral with the second body which is formed as a screw, an end of which constituting a hollow threaded nose projecting from said collar for connecting the assembly with a jack.

6. A connecting assembly according to claim 5 wherein said second channel comprises an annular chamber between said collar and said second body, a connection channel being formed into a lateral wall of said second body.

7. A connecting assembly according to claim 1 wherein said fastening means comprises fastening means for fastening said second body into said collar and fastening means for fastening said first body on said jack, said second channel being a cylincrical chamber in the inner volume of said collar between said second body and a separate ferrule for fastening said collar on said jack is provided.

8. A connecting assembly according to claim 1 wherein said second operational means are rapid venting means for the jack.

9. A connecting assembly according to claim 1 wherein said second operational means are blocking means for the jack.

10. A connecting assembly according to claim 1 wherein said second operational means are sensor means for sensing pressure drop.

* * * * *